US012573725B2

(12) United States Patent
Imamoto

(10) Patent No.: US 12,573,725 B2
(45) Date of Patent: Mar. 10, 2026

(54) RESIN FILM FOR A TERMINAL AND ENERGY STORAGE DEVICE USING THE SAME

(71) Applicant: TOPPAN INC., Tokyo (JP)

(72) Inventor: Junya Imamoto, Tokyo (JP)

(73) Assignee: TOPPAN INC., Tokyo (JP)

( * ) Notice: Subject to any disclaimer, the term of this patent is extended or adjusted under 35 U.S.C. 154(b) by 655 days.

(21) Appl. No.: 17/972,783

(22) Filed: Oct. 25, 2022

(65) Prior Publication Data

US 2023/0055748 A1 Feb. 23, 2023

Related U.S. Application Data

(63) Continuation of application No. PCT/JP2021/001853, filed on Jan. 20, 2021.

(30) Foreign Application Priority Data

Apr. 28, 2020 (JP) ................................. 2020-079387

(51) Int. Cl.
*H01M 50/562* (2021.01)
*H01M 50/55* (2021.01)

(52) U.S. Cl.
CPC ......... *H01M 50/562* (2021.01); *H01M 50/55* (2021.01)

(58) Field of Classification Search
CPC .. H01M 50/562; H01M 50/55; H01M 50/193; H01M 50/197; H01M 50/178;

(Continued)

(56) References Cited

U.S. PATENT DOCUMENTS 9,960,392 B2 † 5/2018 Takada
2019/0143646 A1 5/2019 Ogiwara et al.
2020/0224016 A1 * 7/2020 Kuroki .................... C08L 23/10

FOREIGN PATENT DOCUMENTS

EP 4 184 631 A1 5/2023
JP 2003-011275 A 1/2003
(Continued)

OTHER PUBLICATIONS

Notice of Opposition issued in corresponding Japanese Patent Opposition No. 2025-700154 dated Mar. 3, 2025.

(Continued)

*Primary Examiner* — Daniel S Gatewood
(74) *Attorney, Agent, or Firm* — Foley & Lardner LLP

(57) ABSTRACT

A resin film for a terminal which includes at least three layers, which define a first outer surface and a second outer surface of the resin film, the first outer surface being opposed to the second outer surface; a first adhesive layer which is one of the three layers and is arranged to form the first outer surface of the resin film; a second adhesive layer which is one of the three layers and is arranged to form the second outer surface of the resin film; and an insulating layer which is arranged between the first adhesive layer and the second adhesive layer. The first adhesive layer contains first polypropylene and second polypropylene. The first polypropylene has a long-chain branched structure. The second polypropylene has no long-chain branched structure and has a melting point of 80° C. to 155° C.

8 Claims, 4 Drawing Sheets

(58) Field of Classification Search
CPC ............. H01M 50/186; H01M 50/191; H01M 50/543; Y02E 60/10
See application file for complete search history.

(56) References Cited

FOREIGN PATENT DOCUMENTS

| | | | |
|----|---------------|-----|---------|
| JP | 2008-004316 A | | 1/2008 |
| JP | 2009-259739 A | | 11/2009 |
| JP | 2010-218766 A | | 9/2010 |
| JP | 2016-023268 A | | 2/2016 |
| JP | 2016-091939 A | | 5/2016 |
| JP | 2016-126995 A | | 7/2016 |
| JP | 2016-199651 A | | 12/2016 |
| JP | 2017033820 A | * | 2/2017 |
| JP | 2017144597 A | * | 8/2017 |
| JP | 2019-085480 A | | 6/2019 |
| JP | 2019220295 A | * | 12/2019 |
| WO | 2015115371 A1 | † | 8/2015 |
| WO | 2017221985 A1 | † | 12/2017 |
| WO | WO-2017/209184 A1 | | 12/2017 |
| WO | WO-2019059222 A1 | * | 3/2019 ............. C08F 10/06 |

OTHER PUBLICATIONS

Third Party Observation issued in corresponding Korean Patent Application No. 10-2022-7040164 dated May 7, 2025.
European Extended Search Report issued in corresponding European Patent Application No. 21797212.4 dated Oct. 23, 2024 (6 pages).
Office Action issued in corresponding Korean Patent Application No. 10-2022-7040164 dated May 12, 2025.

* cited by examiner
† cited by third party

<u>13</u>

RESIN FILM FOR A TERMINAL AND ENERGY STORAGE DEVICE USING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/001853, filed on Jan. 20, 2021, which in turn claims the benefit of JP 2020-079387, filed Apr. 28, 2020 the disclosures of all which are incorporated herein by reference in its entirety.

TECHNICAL FIELD

The present disclosure generally relates to a resin film for a terminal, and an energy storage device using the same.

BACKGROUND ART

In recent years, there have been increasing demands for miniaturization of portable devices or effectively using electrical energy generated from natural resources. Therefore, to meet the demands, research and development has been conducted to produce lithium-ion secondary batteries (a type of energy storage device) from which higher voltages are available and in which electrical energy can be stored at an increased density.

In the past, metallic cans have often been used as a package for such lithium ion cells. However, to meet the demands for thinner and more diversified products to which the lithium ion batteries are applied, pouched laminates in which a metal layer (such as an aluminum foil) and a resin film are laminated, which can be produced at low cost, have become common as a package.

A laminate type lithium ion secondary battery which has a battery body disposed and sealed in the package is equipped with a current output terminal usually referred to as a tab. The tab includes a metal terminal (sometimes also referred to as a "tab lead") and a resin film for a terminal (sometimes also referred to as a "tab sealant") (see for example, PTLs 1 to 3). The metal terminal is connected to the negative electrode or positive electrode of the battery body and extended to the package (packaging material). The resin film for a terminal covers a part of the outer peripheral surface of the metal terminal. The resin film for a terminal is usually fused to the metal terminal.

[Citation List] [Patent Literatures] PTL 1: JP 2008-4316 A; PTL 2: JP 2010-218766 A; PTL 3: JP 2009-259739 A.

SUMMARY OF THE INVENTION

Technical Problem

In recent years, battery packs have been increasingly exposed to high temperatures due to an increase in the temperature of chemical conversion process in manufacturing batteries and thermal runaway caused by rapid charging. Exposing a battery pack to a high temperature environment leads to a problem of decreasing the adhesion between the packaging material and the tab sealant.

The purpose of the present disclosure is to provide a resin film for a terminal and an energy storage device using the same. The resin film for a terminal has excellent adhesion between a packaging material and a metal terminal under a room temperature environment and can sufficiently maintain the adhesion to the packaging material even when exposed to a high temperature environment.

Solution to Problem

To achieve the above-mentioned objects, the present disclosure provides a resin film for a terminal which includes at least three layers. The resin film covers a part of an outer peripheral surface of a metal terminal. The metal terminal is electrically connected to an energy storage device body of an energy storage device. The resin film includes at least three layers which define a first outer surface and a second outer surface of the resin film, the first outer surface being opposed to the second outer surface; a first adhesive layer which is one of the three layers and is arranged to form the first outer surface of the resin film; a second adhesive layer which is one of the three layers and is arranged to form the second outer surface of the resin film; and an insulating layer which is arranged between the first adhesive layer and the second adhesive layer. The first adhesive layer contains first polypropylene and second polypropylene. The first polypropylene has a long-chain branched structure. The second polypropylene has no long-chain branched structure and has a melting point of 80° C. to 155° C.

As a result of intensive study, the inventor of the present invention has found that the reason why the adhesion between the packaging material and the tab sealant decreases when exposed to a high temperature environment is that an electrolyte undergoes foaming in the high temperature environment and thus a gap is formed between the packaging material and the tab sealant. In addition, it was found that the foaming of the electrolyte occurred frequently, especially in the tab sealant on the packaging material side of the energy storage device. As a result of further study, the inventor of the present invention has found that it is possible to suppress foaming starting from a tab sealant by arranging a layer in contact with the packaging material. The packaging material contains polypropylene having a long-chain branched structure, and polypropylene having no long-chain branched structure and having a melting point of 80° C. to 155° C.

In the resin film for a terminal, polypropylene having the long-chain branched structure may have a content of 1 mass % to 50 mass % relative to a total amount of the first adhesive layer. If the content of the polypropylene having a long-chain branched structure is 1 mass % to 50 mass % relative to the total amount of the first adhesive layer, the adhesion between the resin film for a terminal and the packaging material is better, and curling of the resin film for a terminal can be further suppressed.

In the resin film for a terminal, the polypropylene having a long-chain branched structure may be polypropylene synthesized using a metallocene catalyst. Since the polypropylene having a long-chain branched structure is polypropylene synthesized using a metallocene catalyst, the adhesion between the resin film for a terminal and the packaging material is improved, and the adhesion between the resin film for a terminal and the package can be better maintained even when exposed to a high temperature environment.

In the resin film for a terminal, the ratio of the thickness of the second adhesive layer to the thickness of the first adhesive layer (second adhesive layer/first adhesive layer) may be 0.2 to 4.5. Since the ratio of the thickness of the second adhesive layer to the thickness of the first adhesive layer is 0.2 to 4.5, curling of the resin film for a terminal can be further suppressed.

In the resin film for a terminal, the absolute difference between the melting point of the first adhesive layer and the melting point of the second adhesive layer may be 0° C. to 15° C. Since the absolute difference between the melting point of the first adhesive layer and the melting point of the second adhesive layer is 0° C. to 15° C., curling of the resin film for a terminal can be further suppressed.

In the resin film for a terminal, the first adhesive layer and/or the insulating layer may contain a filler. If the first adhesive layer and/or the insulating layer contain a filler, the adhesion between the resin film for a terminal and the packaging material can be maintained even when exposed to a high temperature environment.

In the resin film for a terminal, the second adhesive layer may contain a resin having a polar group. If the second adhesive layer contains a resin having a polar group, the adhesion between the resin film for a terminal and the metal terminal is improved.

The present disclosure also provides an energy storage device including: an energy storage device body; a metal terminal which is electrically connected to the energy storage device body; a packaging material which grips the metal terminal therein and has the energy storage device body disposed therein; and a resin film for a terminal which is disposed between the metal terminal and the packaging material and which covers a part of the outer peripheral surface of the metal terminal, wherein the first adhesive layer is in contact with the packaging material and the second adhesive layer is in contact with the metal terminal. Such an energy storage device provides excellent adhesion between the packaging material and the metal terminal under a room temperature environment, and can sufficiently maintain the adhesion between the resin film for a terminal and the packaging material even when exposed to a high temperature environment.

Advantageous Effects of the Invention

According to the present disclosure, a resin film for a terminal and an energy storage device using the same provide excellent adhesion between a packaging material and a metal terminal under a room temperature environment, and can sufficiently maintain adhesion to the packaging material even when exposed to a high temperature environment.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Figure 1:
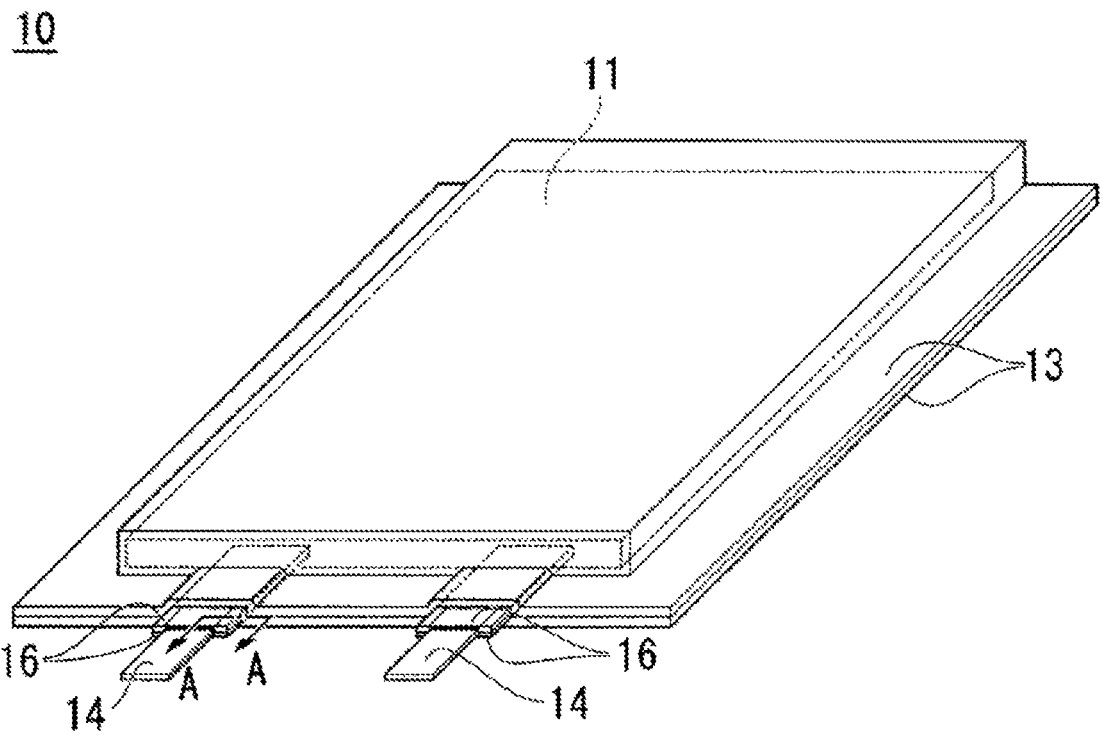
FIG. 1 is a perspective view illustrating a schematic configuration of an energy storage device according an embodiment of the present disclosure.

FIG. 1 is a perspective view illustrating a schematic configuration of an energy storage device according to an embodiment of the present disclosure. FIG. 1 shows a lithium ion secondary battery as an example of an energy storage device 10. The following description is provided by way of this example. The lithium ion secondary battery, whose configuration is shown in FIG. 1, is often called a battery pack or a battery cell.

The energy storage device 10 shown in FIG. 1 is a lithium ion secondary battery, and includes an energy storage device body 11, a packaging material 13, a pair of metal terminals 14 (tab leads), and a resin film for a terminal 16 (tab sealant).

The energy storage device body 11 is a battery that performs charging or discharging. The packaging material 13 grips the metal terminal 14 therein and has the energy storage device body 11 disposed therein. The packaging material 13 covers the surface of the energy storage device body 11 and is in contact with a part of the resin film for a terminal 16.

Figure 2:
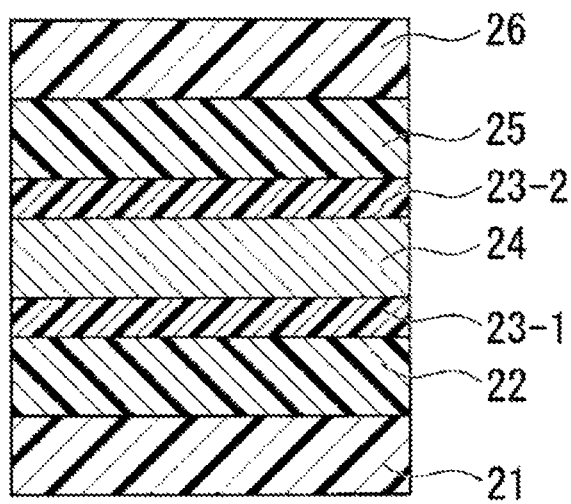
FIG. 2 is a cross-sectional view illustrating an example of a cross-section of the packaging material shown in FIG. 1.

FIG. 2 is a cross-sectional view illustrating an example of a cross section of the packaging material shown in FIG. 1.

In FIG. 2, the same components as those shown in FIG. 1 are denoted by the same reference signs.

Referring now to FIG. 2, an example of a configuration of the packaging material 13 will be described. The packaging material 13 is structured in seven layers which include an inner layer 21, an inner layer-side adhesive layer 22, an anti-corrosion treatment layer 23-1, a metal layer serving as a barrier layer 24, an anti-corrosion treatment layer 23-2, an outer layer-side adhesive layer 25, and an outer layer 26. The layers are laminated in this order from an inner side of the packaging material 13 in contact with the energy storage device body 11.

For example, the inner layer 21 is a sealant layer that imparts sealing properties to the packaging material 13 by heat sealing, and is a layer which is arranged inside and heat-sealed when the energy storage device 10 is assembled. Base materials that can be used for the inner layer (sealant layer) 21 include, for example, polyolefin resins, or acid-modified polyolefin resins obtained by graft-modifying polyolefin resins with maleic anhydrides. The polyolefin resins that can be used include: low-density, medium-density and high-density polyethylenes; ethylene-α-olefin copolymers; homo-, block- or random-polypropylenes; and propylene-α-olefin copolymers. Among these, the polyolefin resin preferably contains polypropylene. These polyolefin resins may be used singly or in combination of two or more.

Furthermore, depending on the required functions, the inner layer 21 may be formed using a single-layer film or a multilayer film in which a plurality of layers are laminated. For example, in order to impart moisture resistance, a multilayer film interposed with a resin such as ethylene-cyclic olefin copolymer or polymethylpentene may be used. In addition, the inner layer 21 may contain, for example, various additives (such as flame retarders, slip agents, anti-blocking agents, antioxidants, light stabilizers, tackifiers, and the like).

For example, the thickness of the inner layer 21 is preferably set in a range of 10 μm to 150 μm, and more preferably 30 μm to 80 μm. When the thickness of the inner layer 21 is 10 μm or more, the heat seal adhesion between the packaging materials 13 and the adhesion to the resin film for a terminal 16 are sufficiently high. Furthermore, when the thickness of the inner layer 21 is 150 μm or less, an increase in the cost of the packaging material 13 can be suppressed.

As the inner layer-side adhesive layer 22, a known adhesive can be appropriately selected and used, such as a generally used adhesive for dry lamination or an acid-modified thermally adhesive resin.

As shown in FIG. 2, it is preferable that the anti-corrosion treatment layers 23-1 and 23-2 are formed on both surfaces of the barrier layer 24 from the viewpoint of performance. However, taking account of cost, the anti-corrosion treatment layer 23-1 alone may be arranged on the inner layer-side adhesive layer 22 side surface of the barrier layer 24.

The barrier layer 24 is, for example, a metal layer having electrical conductivity. The barrier layer 24 may be made of, for example, aluminum, stainless steel, or the like, but aluminum is preferable from the perspective of cost or weight (density).

As the outer-layer side adhesive layer 25, for example, a general polyurethane adhesive containing polyester polyol, polyether polyol, or acrylic polyol as a main resin can be used.

Layers that can be used for the outer layer 26 include, for example, single-layer films or multi-layer films such as nylon or polyethylene terephthalate (PET). Similar to the inner layer 21, the outer layer 26 may contain various additives (e.g. flame retarders, slip agents, anti-blocking agents, antioxidants, light stabilizers, tackifiers, and the like), for example. Furthermore, the outer layer 26 may include, as a measure against fluid leakage, a protective layer formed, for example, by laminating a resin which is insoluble in an electrolyte, or coating a resin component which is insoluble in an electrolyte.

Figure 3:
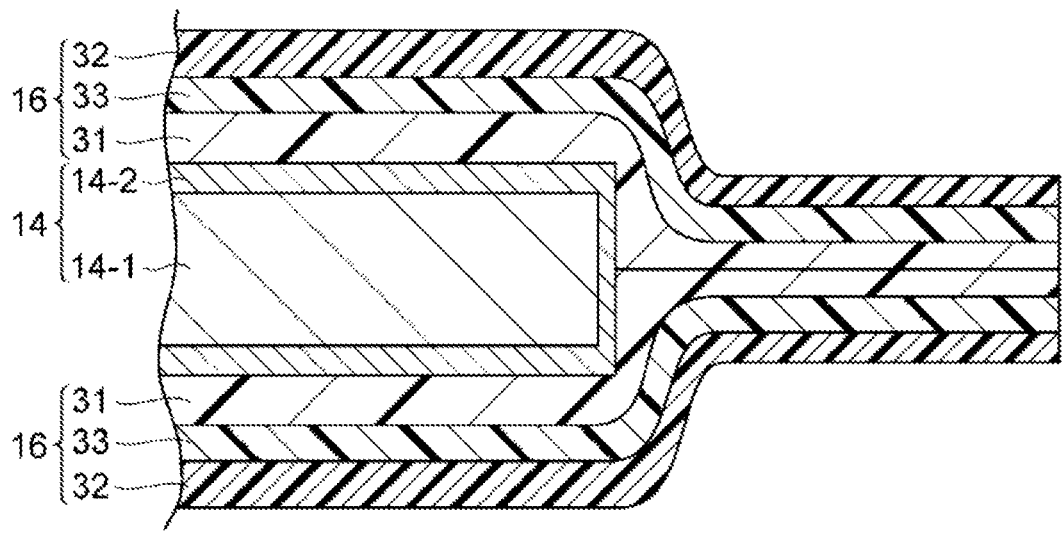
FIG. 3 is a cross-sectional view taken along the line A-A of FIG. 1, illustrating the resin film for a terminal and the metal terminal shown in FIG. 1.

FIG. 3 is a cross-sectional view taken along the line A-A of FIG. 1 illustrating a resin film for a terminal and a metal terminal. In FIG. 3, components identical with those of the structure shown in FIG. 1 are given the same reference signs.

As shown in FIGS. 1 and 3, a pair (two in FIG. 1) of metal terminals 14 each include a metal terminal body 14-1 and an anti-corrosion layer 14-2. Of the pair of metal terminal bodies 14-1, one metal terminal body 14-1 is electrically connected to a positive electrode of the energy storage device body 11, and the other metal terminal body 14-1 is electrically connected to a negative electrode of the energy storage device body 11. The pair of metal terminal bodies 14-1 extend in a direction away from the energy storage device body 11, while being partially exposed from the packaging material 13. The pair of terminal bodies 14-1 may be in a plate-like shape, for example.

The metal terminal bodies 14-1 may be made of a metal. The metal used as the material for the metal terminal bodies 14-1 is preferably determined in consideration of the structure of the energy storage device body 11 and the materials of the respective components of the energy storage device body 11.

For example, when the energy storage device 10 is a lithium ion secondary battery, aluminum is used as a positive electrode current collector, while copper is used as a negative electrode current collector. For this case, aluminum is preferably used as the material for the metal terminal body 14-1 which is connected to the positive electrode of the energy storage device body 11. Furthermore, taking account of corrosion resistance to an electrolyte, an aluminum material, such as 1N30 having purity of 97% or more is preferably used, for example, as a material for the metal terminal body 14-1 connected to the positive electrode of the energy storage device body 11. In addition, when the metal terminal body 14-1 is bent, an annealed metal material which is heat-treated by sufficient annealing is preferably used for the purpose of adding flexibility. As a material used for the metal terminal body 14-1 connected to the negative terminal of the energy storage device body 11, it is preferable to use copper whose surface is provided with a nickel-plated layer, or to use nickel.

The thickness of the metal terminal bodies 14-1 can be set according to the size or capacity of the lithium ion secondary battery. When the lithium ion secondary battery is of a small size, the thickness of the metal terminal bodies 14-1 is preferably 50 μm or more, for example. When the lithium ion secondary battery is of a large size so as to be applicable such as to electrical storage and vehicle installation, the thickness of the metal terminal bodies 14-1 can be appropriately set to within the range of 100 μm to 500 μm, for example.

The anti-corrosion layer 14-2 is arranged covering at least part of the surface of the metal terminal body 14-1. Lithium ion secondary batteries include an electrolyte that contains corrosive components, such as $LiPF_6$. The anti-corrosion layer 14-2 minimizes corrosion of the metal terminal body 14-1 caused by the corrosive components, such as $LiPF_6$, contained in the electrolyte.

As shown in FIG. 3, the resin film for a terminal 16 covers a part of the outer peripheral surface of the metal terminal 14. In the present embodiment, the resin film for a terminal 16 includes at least three layers. The three layers are a second adhesive layer (hereinafter also referred to as the innermost layer) 31, a first adhesive layer (hereinafter also referred to as the outermost layer) 32, and an insulating layer (also referred to as the intermediate layer) 33, which are laminated. The second adhesive layer 31 is in contact with the outer peripheral side surface of the metal terminal 14, the first adhesive layer 32 is in contact with the packaging material 13, and the insulating layer 33 is disposed between the innermost layer 31 and the outermost layer 32. The first adhesive layer 32 is arranged to form one outer surface of the resin film for a terminal 16, and the second adhesive layer 31 is arranged on a surface opposite to the first adhesive layer of the resin film for a terminal 16. The resin film for a terminal 16 may include layers in addition to the innermost layer, the outermost layer, and the intermediate layer.

The innermost layer 31, which covers the outer peripheral surface of the metal terminal 14, seals the metal terminal 14 in the circumferential direction of the metal terminal 14, while achieving adhesion between the resin film for a terminal 16 and the metal terminal 14. The outermost layer 32 also has a function of sealing the interior of the packaging material 13 by being fused with the packaging material 13.

[Innermost Layer]

In the present embodiment, the innermost layer 31 is a layer fused to the metal terminal. The innermost layer 31 preferably contains a resin having a polar group (hereinafter also referred to as "polar resin") from the viewpoint of better adhesion to the metal terminal. Examples of the polar group include a hydroxyl group, a glycidyl group, an amide group, an imino group, an oxazoline group, an acid anhydride group, a carboxyl group, and an ester group. From the viewpoint of reactivity, an acid anhydride group (particularly a group derived from maleic anhydride) is preferable as the polar group. Examples of the polar resin include the modified polyolefin having the polar group, polyhydroxy-polyolefin oligomers, and ethylene/acrylic acid/glycidyl methacrylate copolymers. The polar resin is preferably a polyolefin modified with an acid anhydride such as maleic anhydride from the viewpoint of reactivity. Examples of the polyolefin include polypropylene, polyethylene, and polybutene.

As the polypropylene, homopolypropylene, random polypropylene, block polypropylene, or low isotactic polypropylene can be used. Among these, random polypropylene or low isotactic polypropylene is preferable from the viewpoint of adhesion to the metal terminal, openability under high temperature environment, and impact resistance. The modified polypropylene is polypropylene having the polar group as described above, and is preferably an acid-modified polypropylene, and more preferably an acid-modified random polypropylene.

Specific examples of polar resins include "Poval" manufactured by Kuraray Co., Ltd. and "Melthene H" manufactured by Tosoh Corporation as polar resins having a hydroxy group, "MODIPER" manufactured by NOF CORPORATION "LOTADER" and "BONDINE" manufactured by Arkema Inc. as polar resins having a glycidyl group, "APOLHYA" manufactured by Arkema Inc. as polar resins having an amide group, "ADMER IP" manufactured by Mitsui Chemicals, Inc. as polar resins having an imino group, and "EPOCROS" manufactured by Nippon Shokubai Co., Ltd. as polar resins having an oxazoline group. The modified resin may be used singly or in combination of two or more.

The melting point of the polar resin is preferably 80° C. to 160° C., more preferably 100° C. to 150° C., and even more preferably 110° C. to 145° C., from the viewpoint of embeddability and heat resistance.

The melting point of resin, as referred to in the present specification, is the temperature when the heat of dissolution reaches a peak top which is referred to as a main peak. The temperature is measured using a differential scanning calorimeter (DSC).

The content of the polar resin in the innermost layer 31 is preferably 40 mass % or more relative to the total amount of the innermost layer 31, from the viewpoint of better adhesion with the metal terminal. The upper limit of the content of the polar resin is not particularly limited, but may be 99 mass % or less, and may be 95 mass % or less.

The innermost layer 31 may contain a resin other than a polar resin. Examples of the resin other than the polar resin include polyolefins such as polypropylene, polyethylene, and polybutene.

In the innermost layer 31, the content of resin other than the polar resin may be 1 mass % to 20 mass % relative to the total amount of the innermost layer 31. When the content of resin other than the polar resin is 1 mass % or more, the adhesion between the innermost layer 31 and the metal terminal tends to further increase. When the content of resin other than the polar resin is 20 mass % or less, decrease in the cohesive force can be suppressed and the sufficient adhesion between the innermost layer 31 and the metal terminal can be maintained.

The innermost layer 31 may include additives other than the component described above. Examples of the additive include antioxidants, slip agents, flame retardants, light stabilizers, dehydrating agents, coloring pigments, tackifiers, and the like. These can be used singly or in combination of two or more. Examples of the coloring pigment include carbon black, quinacridone pigments, polyazo pigments, and isoindolinone pigments.

The innermost layer 31 preferably has a thickness in the range of 10 μm to 100 m, and more preferably in the range of 15 μm to 50 μm. The innermost layer 31 having a thickness of 10 μm or more provides better adhesion to the metal terminal 14. The innermost layer 31 having a thickness of 100 μm or less suppresses an increase in the cost of the resin film for a terminal 16.

[Outermost Layer]

In the present embodiment, the outermost layer 32 is, for example, a layer to be fused with a packaging material. The outermost layer 32 contains polypropylene having a long-chain branched structure and polypropylene having no long-chain branched structure and having a melting point of 80° C. to 155° C. When the outermost layer contains polypropylene having a long-chain branched structure, and polypropylene having no long-chain branched structure and having a melting point of 80° C. to 155° C., adhesion to the packaging material under a room temperature environment is excellent and the adhesion to the packaging material can be sufficiently maintained even when exposed to a high temperature environment.

Polypropylene having a long-chain branched structure (hereinafter also referred to as "long-chain branched PP") refers to polypropylene having a branched structure with a molecular chain having several tens or more carbon atoms in the main chain and an average molecular weight of several hundred or more. The polypropylene having a long-chain branched structure may be a homopolymer of propylene or a copolymer. When propylene having a long-chain branched structure is a copolymer, the comonomer may be at least one kind of olefin selected from the group consisting of ethylene and α-olefins having 4 to 10 carbon atoms, and the content of the comonomer in the long-chain branched PP is preferably 3 mass % or less. The long chain branched PP is preferably a propylene homopolymer because it has higher heat resistance and rigidity.

The long-chain branched PP can be produced by a method of electron crosslinking or by synthesis using a metallocene catalyst. From the viewpoint of suppressing gel generation and obtaining sufficient strength, it is preferable that the long-chain branched PP is synthesized using a metallocene catalyst. The fact that long-chain branched PP has been synthesized using the metallocene catalyst can be confirmed by analyzing the catalyst residue using analytical methods such as infrared spectroscopy (IR), NMR spectroscopy, mass spectrometry (MS), X-ray analysis, and Raman spectroscopy.

The melting point of the long-chain branched PP is preferably 100° C. to 170° C. and more preferably 130° C. to 160° C., from the viewpoint of embeddability and heat resistance.

In the outermost layer 32, the content of the long-chain branched PP is preferably 1 mass % to 50 mass %, more preferably 3 mass % to 30 mass %, and still more preferably 5 mass % to 20 mass % relative to the total amount of the outermost layer 32. When the content of the long-chain branched PP is 1 mass % or more, foaming in the outermost layer can be further suppressed. When the content of the long-chain branched PP is 50 mass % or less, embeddability is improved, and sufficient adhesion with the packaging material can be maintained, and also curling of the resin film for a terminal can be further suppressed.

Polypropylene having no long-chain branched structure and having a melting point of 80° C. to 155° C. refers to polypropylene having a melting point of 80° C. to 155° C., and does not correspond to polypropylene having a long-chain branched structure as described above. The polypropylene having no long-chain branched structure and having a melting point of 80° C. to 155° C. may be a homopolypropylene having a melting point of 80° C. to 155° C., a random polypropylene, a block polypropylene, a low isotactic polypropylene, or the like. The polypropylene having no long-chain branched structure and having a melting point of 800 to 155° C. may be modified.

The melting point of the polypropylene having no long-chain branched structure and having a melting point of 80° C. to 155° C. is more preferably 100° C. to 150° C., and even more preferably 105° C. to 145° C. from the viewpoint of adhesion to the packaging material and heat resistance.

The outermost layer 32 preferably contains a filler from the viewpoint of further suppressing foaming in the outermost layer. The filler may be an inorganic filler such as aluminum oxide, silicon oxide, magnesium oxide, zirconium oxide, calcium carbonate, zirconium silicate, zinc oxide, barium sulfate, copper oxide, cobalt oxide, titanium oxide, tin oxide, iron oxide, antimony oxide, boron nitride, aluminum nitride, silicon nitride, or the like. These can be used singly or in combination of two or more. The filler preferably has an average particle size in the range of 0.1 μm to 25 μm. The content of the filler is preferably 0.05 mass % to 10 mass %, and more preferably 0.1 mass % to 5 mass % relative to the total amount of the outermost layer 32. The filler content of 0.05 mass % or more further suppresses the decrease in the adhesion due to foaming. The filler content of 10 mass % or less maintains sufficient adhesion to the packaging material.

Resins and additives other than those described above may be added to the outermost layer 32. Examples of the additive include antioxidants, slip agents, flame retarders, light stabilizers, dehydrating agents, coloring pigments, tackifiers, and the like. These can be used singly or in combination of two or more. Examples of the coloring pigment include carbon black, quinacridone pigments, polyazo pigments, and isoindolinone pigments.

The outermost layer 32 preferably has a thickness in the range of 10 to 100 μm, and more preferably in the range of 15 to 50 μm. The outermost layer 32 having a thickness of m or more provides better adhesion to the packaging material 13. The outermost layer 32 having a thickness of 100 μm or less suppresses an increase in the cost of the resin film for a terminal 16.

The melting points of the innermost layer 31 and the outermost layer 32 are the temperature when the heat of dissolution reaches a peak top which is referred to as a main peak, and can be set to the melting points of each layer. The temperature is measured using a differential scanning calorimeter (DSC). The absolute difference (difference in absolute value) between the melting point of the innermost layer 31 and the melting point of the outermost layer 32 is preferably 0° C. to 15° C., more preferably 0° C. to 10° C., and even more preferably 0° C. to 5° C., from the viewpoint of further suppressing curling of the resin film for a terminal.

[Intermediate Layer]

The intermediate layer 33 is arranged between the innermost layer 31 and the outermost layer 32. One surface of the intermediate layer 33 may be covered with the innermost layer 31, and the other surface may be covered with the outermost layer 32.

The intermediate layer 33 includes an insulating layer. The insulating layer is a layer that prevents the sealant (the sealant layer of the packaging material and the innermost layer and the outermost layer of the resin film for a terminal) from flowing out during heat sealing and causing the exposed metal layer of the packaging material to come into contact with the metal terminals, thereby degrading the insulation. Therefore, the insulating layer is preferably formed using a resin having a high melting point or glass transition temperature, which does not flow out during heat sealing.

As the resin constituting the insulating layer, for example, polyethylene terephthalate, polyethylene naphthalate, polyphenylene sulfide, polymethylpentene, polyacetal, cyclic polyolefin, polyamide, polycarbonate, polyphenylene ether, polypropylene and the like can be used. Among these, from the viewpoint of film forming properties, interlayer adhesion, and impact resistance, polypropylene may preferably be used, and block polypropylene is particularly preferable. These resins preferably have a melting point or a glass transition temperature (Tg) higher than that of the resin used in the innermost layer 31 and the outermost layer 32. These resins may be used singly or in combination of two or more.

The insulating layer preferably contains a filler from the viewpoint of further suppressing foaming in the outermost layer. The above-mentioned inorganic filler which can be used in the outermost layer can be similarly used as the filler. These can be used singly or in combination of two or more. The filler preferably has an average particle size in the range of 0.1 μm to 25 μm. The content of the filler is preferably 0.1 mass % to 30 mass %, and more preferably 1 mass % to 15 mass % relative to the total amount of the insulating layer (intermediate layer 33). The filler content of 0.1 mass % or more further suppresses the decrease in the adhesion due to foaming. The filler content of 30 mass % or less maintains sufficient embeddability.

The insulating layer may be colored by adding a coloring pigment to the insulating layer. The visibility of the resin film for a terminal 16 can be improved by coloring the insulating layer. Thus, accuracy is improved in inspecting the resin film for a terminal 16 (for example, in inspecting whether the resin film for a terminal 16 is attached to the metal terminal 14, or in inspecting the position where the resin film for a terminal 16 is attached relative to the metal terminal 14). Examples of the coloring pigment include copper oxide, cobalt oxide, zinc oxide, titanium oxide, carbon black, barium sulfate, quinacridone pigments, polyazo pigments, and isoindolinone pigments.

The intermediate layer 33 may further include a layer having a configuration other than the above-described insulating layer. Specifically, the intermediate layer 33 may be a single-layer structure consisting of an insulating layer, or may be a multilayer structure having a plurality of resin layers in addition to the insulating layer via an adhesive. The intermediate layer 33 may include, for example, a layer containing a resin having a crosslinked structure (crosslinked layer), or a layer containing at least one kind selected from the group consisting of fillers and fibers (reinforcing layer).

Examples of the resin having a crosslinked structure in the crosslinked layer include crosslinked acrylic resin, epoxy resin, phenol resin, urea resin, melamine resin, and polyurethane resin. These can be used singly or in combination of two or more.

The filler used for the reinforcing layer may be the same as that for the insulating layer. The content of the filler is preferably 0.5 mass % to 20 mass % relative to the total amount of the reinforcing layer.

The fibers of the reinforcing layer may be a cellulose resin or a resin having a melting point of 200° C. or higher used for the heat-resistant layer. These can be used singly or in combination of two or more. The width of the fibers is preferably from 10 nm to 10 μm, and the content of the fibers may be preferably from 0.5 mass % to 70 mass % relative to the total amount of the reinforcing layer. The fibers may also form a nonwoven fabric.

The reinforcing layer can be a layer in which the filler and/or the fiber mentioned above is dispersed in the polyolefin resin, the resin having a melting point of 200° C. or higher, or the resin having a crosslinked structure.

The thickness of the intermediate layer 33 (the entire thickness in the case of a multilayer structure) is, for example, appropriately set in the range of 10 μm to 200 μm, and is preferably 20 μm to 100 μm. In terms of the thickness of the intermediate layer 33, it is important that there is a balance between the thickness of the metal terminal 14 and the thickness of the innermost layer 31. Therefore, when the innermost layer 31 and the metal terminal 14 are thick, the thickness of the intermediate layer 33 may have a large thickness accordingly.

The total thickness of the innermost layer 31, the outermost layer 32, and the intermediate layer 33 (thickness of the resin film for a terminal 16) is, from the viewpoint of the heat-sealing properties, and embeddability and insulating properties of the metal terminal, preferably from 10 μm to 500 μm, more preferably from 15 μm to 300 μm, and even more preferably from 30 μm to 200 μm.

The ratio of thicknesses of the innermost layer 31, the intermediate layer 33, and the outermost layer 32 (the innermost layer 31: the intermediate layer 33: the outermost layer 32) may be for example 2:1:2, 1:2:1, and 1:1:1, and the thicknesses of the innermost layer 31 and the outermost layer 32 may be the same when the intermediate layer 33 serves as the insulating layer. The ratio of the thicknesses of the innermost layer 31, the intermediate layer 33, and the outermost layer 32 (the innermost layer 31: the intermediate layer 33: the outermost layer 32) may be for example 3:1:1, 2:2:1, or 5:3:2, and the thickness of the innermost layer 31 in contact with the metal terminal may be larger than the thickness of the outermost layer 32, from the viewpoint of embeddability of the metal terminal. Alternatively, the ratio of the thicknesses of the innermost layer 31, the intermediate layer 33, and the outermost layer 32 may be for example 1:1:3, 1:2:2, or 2:3:5, and the thickness of the outermost layer 32 in contact with the packaging material may be thicker than the thickness of the innermost layer 31, from the viewpoint of adhesion to the packaging material.

When the thicknesses of the innermost layer 31 and the outermost layer 32 are the same, the ratio of the thickness of the innermost layer 31 or the outermost layer 32 to the thickness of the intermediate layer 33 (innermost layer 31 or outermost layer 32: intermediate layer 33) may be 1:3 to 3:1, or 1:2 to 2:1. When the thickness of the innermost layer 31 is different from the thickness of the outermost layer 32, the ratio of the thickness of the innermost layer 31 to the thickness of the intermediate layer 33 (the innermost layer 31: the intermediate layer 33) may be 4:1 to 1:1, or may be 3:1 to 1:1. The ratio of the thickness of the outermost layer 32 to the thickness of the intermediate layer 33 (the outermost layer 32: the intermediate layer 33) may be 1:3 to 3:1, or may be 1:2 to 2:1. The ratio of the thickness of the innermost layer 31 to the thickness of the outermost layer 32 (the innermost layer 31: the outermost layer 32) may be 1:5 to 9:2, more preferably 3:10 to 7:2, and even more preferably 2:5 to 5:2, from the viewpoint of further suppressing curling of the resin film for a terminal. That is, the ratio of the thickness of the innermost layer to the thickness of the outermost layer (innermost layer/outermost layer) is preferably 0.2 to 4.5, more preferably 0.3 to 3.5, and even more preferably 0.4 to 2.5, from the viewpoint of further suppressing curling of the resin film for a terminal.

While a preferred embodiment of the present disclosure has been described above, the present disclosure is not limited to this specific embodiment, and various alterations and modifications can be made within the scope of the present disclosure as defined in the appended claims.

For example, in FIG. 3, a resin film for a terminal 16 having a three-layer structure has been described as an example. However, a second intermediate layer composed of an insulating resin and the like may be disposed between the intermediate layer 33 and the innermost layer 31, and between the intermediate layer 33 and the outermost layer 32.

By arranging a second intermediate layer between the intermediate layer 33 and the innermost layer 31, and between the intermediate layer 33 and the outermost layer 32 to form a multilayer structure having four or more layers, it is possible to improve the insulation properties between the intermediate layer 33 and the barrier layer 24 (metal layer) constituting the packaging material 13, and the insulation properties between the intermediate layer 33 and the metal terminal 14. The second intermediate layer may also be the crosslinked layer or the reinforcing layer described above.

Furthermore, the innermost layer 31 and the outermost layer 32 may have the same configuration as each other, or may have different configurations to each other. Specifically, in the resin film for a terminal of the present disclosure, at least one of the layers on the surface of the resin film for a terminal may satisfy the requirements of the outermost layer, and the other layer need not satisfy the requirements of the outermost layer. Therefore, one of the innermost layer 31 and the outermost layer 32 may be a layer containing polypropylene having a long-chain branched structure and polypropylene having no long-chain branched structure and having a melting point of 80° C. to 155° C., and the other may be a layer containing one or both of polypropylene having a long-chain branched structure and polypropylene having no long-chain branched structure and having a melting point of 80° C. to 155° C.

Next, a method of producing the resin film for a terminal 16 of the present embodiment will be briefly described. The method of producing the resin film for a terminal 16 is not particularly limited. The resin film for a terminal 16 can be fabricated using a film-extrusion fabrication device having a die, such as a round die used in inflation molding or a T-die used in die pressing. However, from the viewpoint of film formation stability, multilayer inflation molding is preferably used.

The following description addresses a method for producing the resin film for a terminal 16 by way of an example of using inflation molding (i.e. using an inflation molding apparatus).

Firstly, base materials for the innermost layer 31, the outermost layer 32, and the intermediate layer 33 are prepared. Then, the base materials of the innermost layer 31, the outermost layer 32, and the intermediate layer 33 are supplied to an inflation molding apparatus. Then, the three base materials are extruded from an extrusion part of the inflation molding apparatus to form a three-layer structure (structure in which the innermost layer 31, the outermost layer 32, and the intermediate layer 33 are laminated) and air is supplied from inside the laminate.

Then, while conveying the cylindrically inflated resin film for a terminal 16, the resin film for a terminal 16 is formed into a flat shape by a guide section, and then a pair of pinch rolls folds the resin film for a terminal 16 into a sheet shape. Both sides of the woven tube are cut open and a pair (two strips) of film is rolled onto a take-up core to produce a rolled resin film for a terminal 16.

For example, the extrusion temperature at which the resin film for a terminal 16 is produced is preferably in the range of 130° C. to 300° C., and more preferably in the range of 130° C. to 250° C. When the extrusion temperature is 130° C. or higher, the resin constituting each layer is sufficiently melted, resulting in a lower melt viscosity, which makes extrusion from a screw more stable. On another front, when the extrusion temperature is 300° C. or lower, oxidation and deterioration of the resin constituting each layer is suppressed. As a result, it is possible to prevent a decrease in quality of the resin film for a terminal 16.

The revolution speed, blow ratio, pulling speed, and the like of each screw can be appropriately determined taking account of the film thickness that has been set. Furthermore, the thickness ratio of the layers of the resin film for a terminal 16 can be easily controlled by changing the revolution speed of each of the screws.

The resin film for a terminal 16 of the present embodiment may be produced through dry lamination using an adhesive, or through sandwich lamination in which formed insulating layers (insulating films) are laminated to each other.

Referring to FIG. 3, a thermal adhesion process will be described in which the resin film for a terminal 16 and the packaging material 13 of the present embodiment are thermally adhered to each other. For example, in the thermal adhesion process, melting of the outermost layer 32 by heating is conducted concurrently with achieving intimate contact between the outermost layer 32 and the packaging material 13 by pressing, thereby thermally adhering the resin film for a terminal 16 and the packaging material 13 to each other.

Furthermore, in the thermal adhesion process described above, in order to obtain sufficient adhesion and sealing properties between the resin film for a terminal 16 and the packaging material 13, heating is conducted to a temperature of at least the melting point of the resin which constitutes the outermost layer 32.

Specifically, for example, a temperature in the range of 140° C. to 170° C. can be used as a heating temperature for the resin film for a terminal 16. The processing time (the total time of the heating time and the pressing time) may be determined in consideration of peeling strength and productivity. The processing time can be appropriately set in the range of 1 to 60 seconds, for example.

When the production takt (productivity) of the resin film for a terminal 16 is prioritized, thermal adhesion may be conducted with a shorter pressing time at a temperature exceeding 170° C. In this case, the heating temperature can be in the range of 170° C. to 230° C., for example, while the pressing time can be in the range of 3 seconds to 20 seconds, for example.

Referring to FIG. 3, a thermal adhesion process will be described in which the resin film for a terminal 16 and the metal terminal 14 of the present embodiment are thermally adhered to each other. For example, in the thermal adhesion process, melting of the innermost layer 31 by heating is conducted concurrently with achieving intimate contact between the innermost layer 31 and the metal terminal 14 by pressing, thereby thermally adhering the resin film for a terminal 16 and the metal terminal 14 to each other.

Furthermore, in the thermal adhesion process described above, in order to obtain sufficient adhesion between the resin film for a terminal 16 and the metal terminal 14, and sealing properties, heating is conducted to a temperature of at least the melting point of the resin which constitutes the innermost layer 31.

Specifically, for example, a temperature in the range of 140° C. to 170° C. can be used as a heating temperature for the resin film for a terminal 16. The processing time (the total time of the heating time and the pressing time) may be determined in consideration of peeling strength and productivity. The processing time can be appropriately set in the range of 1 to 60 seconds, for example.

When the production takt (productivity) of the resin film for a terminal 16 is prioritized, thermal adhesion may be conducted with a shorter pressing time at a temperature exceeding 170° C. In this case, the heating temperature can be in the range of 170° C. to 230° C., for example, while the pressing time can be in the range of 3 seconds to 20 seconds, for example.

EXAMPLES

The present disclosure will be more specifically described below based on Examples and Comparative Examples. However, the present disclosure is not limited to the following Examples.

[Materials Used]

Materials used in examples and comparative example are shown in Table 1 below.

TABLE 1

| Component | | Detail | Melting point (° C.) |
|---|---|---|---|
| Polypropylene having a long-chain branched structure (long-chain branched PP) | A1 | Synthesized using a metallocene catalyst | 157 |
| | A2 | Synthesized by electron crosslinking | 160 |
| Polypropylene having no long-chain branched structure (PP) | B1 | Acid-modified random PP | 140 |
| | B2 | Acid-modified random PP | 105 |
| | B3 | Acid-modified random PP | 155 |
| | B4 | Acid-modified low isotactic PP | 106 |
| | B5 | Acid-modified homo PP | 165 |
| | B6 | Random PP | 140 |
| Base PP | C1 | Block PP | 165 |
| Polar resin | D1 | Polyhydroxypolyolefin oligomer | 65 |
| Filler | E1 | Silicon oxide | — |
| | E2 | Titanium oxide | — |

[Preparation of Resin Film for a Terminal]

Examples 1 to 15 and Comparative Examples 1 to 4

The base materials for each layer were prepared by dry blending each ingredient in the amounts (unit: mass %, abbreviated as "%" in the table) shown in Table 2. Measurement of the heat of fusion of each film by DSC resulted in detecting peaks corresponding to the melting point of each resin component. The absolute difference between the melting point of the outermost layer and that of the innermost layer is shown in Table 2.

Then, the base material of the first adhesive layer (outermost layer), the base material of the insulating layer (intermediate layer), and the base material of the second adhesive layer (innermost layer) were set inside an inflation type film extrusion production device (Co-GI type) manufactured by Sumitomo Heavy Industries Modern Ltd., and the three base materials were extruded using the film extrusion production device to produce a resin film for a terminal having a three-layer structure composed of outermost layer/intermediate layer/innermost layer (however, Comparative Example 4 is a resin film for a terminal having a two-layer structure composed of intermediate layer/innermost layer). The melting temperature of each base material was 210° C. The thickness of each layer in the resin film for a terminal of each Example was as shown in "thickness [µm] of outer/middle/inner" in Table 2. The "outer/medium/inner" in Table 2 means the outermost layer (outer)/medium layer (middle)/inner layer (inner).

[Measurement of Initial (Room Temperature) Heat Seal Strength of Lead]

Figure 4:
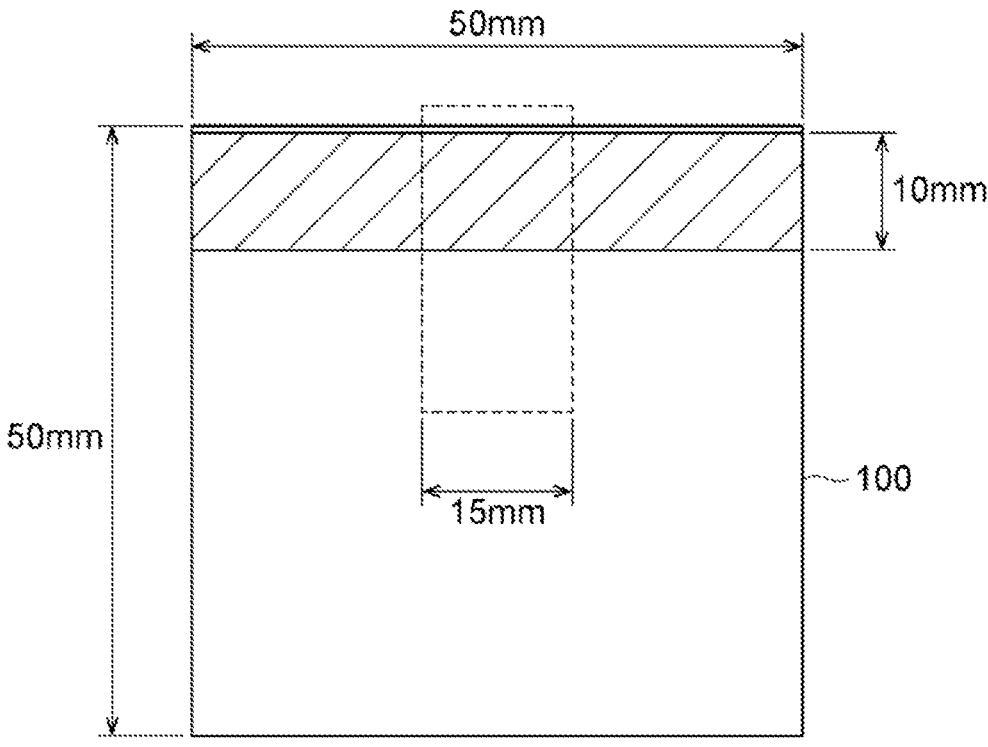
FIG. 4 is a schematic diagram illustrating a method of producing specimens for measuring a heat seal strength in the Examples.

A specimen obtained by cutting the resin film for a terminal into a size of 50 mm (TD)×100 mm (MD) was folded in two so as to sandwich a chemically treated aluminum foil cut to a size of 50 mm×50 mm, and the side on the opposite side to the folded section was heat sealed at 165° C./0.6 MPa/10 seconds with a width of 10 mm. Then, a specimen for the heat seal strength measurement was prepared by cutting the heat-sealed portion to a width of 15 mm at a center portion of a length of the heat-sealed portion (see FIG. 4). In the present evaluation, the laminate 100 in FIG. 4 is made of the resin film for a terminal/aluminum foil/resin film for a terminal. A T-peel test to peel the aluminum foil (lead) and the resin film of the heat-sealed portion of the specimen away from each other was performed for the heat-sealed portion of the specimen using a tensile tester (manufactured by Shimadzu Corporation) under room temperature (25° C.) environmental conditions and a tensile speed of 50 mm/min. From the obtained results, the initial heat seal strength of the lead was evaluated based on the following evaluation criteria. "A", "B", or "C" in the evaluation columns represents "acceptable" and "D" represents "unacceptable". The results are shown in Table 2.

A: Heat seal strength of 25 N/15 mm or more

B: Heat seal strength of 20 N/15 mm or more and less than 25 N/15 mm

C: Heat seal strength of 15 N/15 mm or more and less than 20 N/15 mm

D: Heat seal strength of less than 15 N/15 mm

[Measurement of Initial (Room Temperature) Heat Seal Strength of Packaging Material]

A specimen obtained by cutting the resin film for a terminal into a size of 50 mm (TD)×100 mm (MD) was folded in two so as to sandwich a chemically treated aluminum foil cut to a size of 50 mm×50 mm, and the side on the opposite side to the folded section was heat sealed at 165° C./0.6 MPa/10 seconds with a width of 10 mm. Then, the sealant layer of the packaging material, which has a laminated structure composed of a nylon film (thickness: 25 µm)/adhesive agent/aluminum foil (thickness: 40 µm)/polypropylene sealant layer (thickness: 80 µm) was folded into two so as to make contact with the resin film for a terminal, and the side on the opposite side to the folded portion (the same location as the location in which the resin film for a terminal and the aluminum foil was heat sealed) was heat sealed at 190° C./0.5 MPa/5 seconds with a width of 10 mm. Then, a specimen for the heat seal strength measurement was prepared by cutting the heat-sealed portion to a width of 15 mm at a center portion of a length of the heat-sealed portion (see FIG. 4). In this evaluation, the laminate 100 in FIG. 4 is composed of a packaging material, a resin film for a terminal, an aluminum foil, a resin film for a terminal, and a packaging material. A T-peel test to peel the packaging material and the resin film for a terminal of the heat-sealed portion of the specimen away from each other was performed for the heat-sealed portion of the specimen using a tensile tester (manufactured by Shimadzu Corporation) under room temperature (25° C.) environmental conditions and a tensile speed of 50 mm/min. From the obtained results, the initial heat seal strength of the packaging material was evaluated based on the following evaluation criteria. "A", "B", or "C" in the evaluation columns represents "acceptable" and "D" represents "unacceptable". The results are shown in Table 2.

A: Heat seal strength of 100 N/15 mm or more

B: Heat seal strength of 90 N/15 mm or more and less than 100 N/15 mm.

C: Heat seal strength of 80 N/15 mm or more and less than 90 N/15 mm

D: Heat seal strength of less than 80 N/15 mm

[Heat Seal Strength of Packaging Material Against Electrolyte]

A specimen obtained by cutting the resin film for a terminal into a size of 50 mm (TD)×100 mm (MD) was folded in two so as to sandwich a chemically treated aluminum foil cut to a size of 50 mm×50 mm, and the side on the opposite side to the folded section was heat sealed at 165° C./0.6 MPa/10 seconds with a width of 10 mm. Then, the sealant layer of the packaging material, which has a laminated structure composed of a nylon film (thickness: 25 µm)/adhesive agent/aluminum foil (thickness: 40 µm)/polypropylene sealant layer (thickness: 80 µm) was folded into two so as to make contact with the resin film for a terminal, and the side on the opposite side to the folded portion (the same location as the location in which the resin film for a terminal and the aluminum foil was heat sealed) was heat sealed at 190° C./0.5 MPa/5 seconds with a width of 10 mm. Then, the remaining two sides excluding the folded portion were heat sealed in the same manner as the side on the opposite side to the folded portion. A pouch is made by heat sealing one of the remaining two sides, injecting 1 mL of an electrolyte into the other side, and then heat sealing the other side. The electrolyte was made by adding 1M of $LiPF_6$ (lithium hexafluorophosphate) to a mixed solution of ethylene carbonate/diethyl carbonate/dimethyl carbonate=1/1/1 (mass ratio). After the prepared pouch was stored at 90° C. for 1 week, the center portion of a length of the heat-sealed portion at the side on the opposite side to the folded portion was cut out with a width of 15 mm (see FIG. 4) to prepare a specimen for measuring the heat seal strength. In this evaluation, the laminate 100 in FIG. 4 is composed of a packaging material, a resin film for a terminal, an aluminum foil, a resin film for a terminal, and a packaging material. A T-peel test to peel the packaging material and the resin film for a terminal of the heat-sealed portion of the specimen away from each other was performed for the heat-sealed portion of the specimen using a tensile tester (manufactured by Shimadzu Corporation) under room temperature (25° C.)

environmental conditions and a tensile speed of 50 mm/min. From the obtained results, the heat seal strength of the packaging material against electrolyte was evaluated based on the following evaluation criteria. "A", "B", or "C" in the evaluation columns represents "acceptable" and "D" represents "unacceptable". The results of the evaluation and the seal strength are shown in Table 2.

A: Heat seal strength of 70 N/15 mm or more

B: Heat seal strength of 60 N/15 mm or more and less than 70 N/15 mm.

C: Heat seal strength of 50 N/15 mm or more and less than 60 N/15 mm

D: Heat seal strength of less than 50 N/15 mm

[Curlability Assessment]

A specimen of resin film for a terminal cut into a size of 50 mm (TD)×100 mm (MD) was placed on a smooth surface, and the heights from the smooth surface were measured at four apexes. The curlability was evaluated using the average of the four heights based on the following evaluation criteria. "A", "B", or "C" in the evaluation columns represents "acceptable" and "D" represents "unacceptable". The results are shown in Table 2.

A: Curl height being less than 15 mm

B: Curl height being 15 mm or more and less than 20 mm

C: Curl height being 20 mm or more and less than 25 mm

D: Curl height being 25 mm or more

TABLE 2

| | | Resin film for a terminal | | | | | | | | | | | Evaluation result | | | |
| | | | | | | | | | | | | | | Room temperature | Heat seal strength of packaging material | |
| | Thickness | Adhesive layer (outermost layer) | | | Insulating layer (intermediate layer) | | | Adhesive layer (innermost layer) | | Thickness ratio | Melting point difference | Room temperature heat seal strength of lead | heat seal strength of aging material | against electrolyte | | |
| | [μm] outer/ middle/ inner | Long-chain branched PP | PP | Filler | Long-chain branched PP | Base PP | Filler | PP | Polar resin | inner/ outer | ence [° C.] | | | Eval-uation | Seal strength N/15 mm | Curla-bility |
| Ex 1 | 25/50/ 25 | A1 15% | B1 84% | E1 1% | — | C1 95% | E2 5% | B1 100% | — | 1.0 | 0 | A | A | A | 84 | A |
| Ex 2 | 25/50/ 25 | A1 40% | B1 59% | E1 1% | — | C1 95% | E2 5% | B1 100% | — | 1.0 | 0 | A | B | A | 77 | B |
| Ex 3 | 25/50/ 25 | A2 15% | B1 84% | E1 1% | — | C1 95% | E2 5% | B1 100% | — | 1.0 | 0 | A | B | B | 65 | A |
| Ex 4 | 25/50/ 25 | A1 15% | B1 85% | — | — | C1 100% | — | B1 100% | — | 1.0 | 9.0 | A | A | A | 71 | A |
| Ex 5 | 25/50/ 25 | A1 15% | B1 84% | E1 1% | — | C1 100% | — | B1 100% | — | 1.0 | 0 | A | A | A | 79 | A |
| Ex 6 | 25/50/ 25 | A1 15% | B1 78% | E1 1% | — | C1 75% | E2 25% | B1 100% | — | 1.0 | 0 | A | B | A | 73 | A |
| Ex 7 | 20/40/ 40 | A1 15% | B1 84% | E1 1% | — | C1 95% | E2 5% | B1 100% | — | 2.0 | 0 | A | A | A | 82 | A |
| Ex 8 | 20/30/ 50 | A1 15% | B1 84% | E1 1% | — | C1 95% | E2 5% | B1 100% | — | 2.5 | 0 | A | A | A | 81 | A |
| Ex 9 | 15/40/ 45 | A1 15% | B1 84% | E1 1% | — | C1 95% | E2 5% | B1 100% | — | 3.0 | 0 | A | A | A | 80 | B |
| Ex 10 | 10/40/ 50 | A1 15% | B1 84% | E1 1% | — | C1 95% | E2 5% | B1 100% | — | 5.0 | 0 | A | A | A | 77 | C |
| Ex 11 | 25/50/ 25 | A1 15% | B2 84% | E1 1% | — | C1 95% | E2 5% | B1 100% | — | 1.0 | 35.0 | A | A | A | 86 | C |
| Ex 12 | 25/50/ 25 | A1 15% | B3 84% | E1 1% | — | C1 95% | E2 5% | B1 100% | — | 1.0 | 10.0 | A | A | A | 80 | B |
| Ex 13 | 25/50/ 25 | A1 15% | B4 84% | E1 1% | — | C1 95% | E2 5% | B1 100% | — | 1.0 | 34.0 | A | A | A | 85 | C |
| Ex 14 | 25/50/ 25 | A1 15% | B1 84% | E1 1% | — | C1 95% | E2 5% | B6 85% | D1 15% | 1.0 | 0.0 | B | A | A | 84 | A |
| Ex 15 | 25/50/ 25 | A1 15% | B1 84% | E1 1% | — | C1 95% | E2 5% | B6 100% | — | 1.0 | 0.0 | C | A | A | 86 | A |

TABLE 2-continued

| | | | | | | | | | | | | | | Evaluation result | | | |
| | | | Resin film for a terminal | | | | | | | | | Room | Room temperature | Heat seal strength of packaging material | | |
| | Thickness | Adhesive layer (outermost layer) | | | Insulating layer (intermediate layer) | | | Adhesive layer | | Thickness | Melting | temperature | heat seal strength | against electrolyte | | |
| | [µm] outer/ | Long-chain | | | Long-chain | | | (innermost layer) | | ness ratio | point differ- | heat seal strength of | of pack- | | Seal strength | |
| | middle/ inner | branched PP | PP | Filler | branched PP | Base PP | Filler | PP | Polar resin | inner/ outer | ence [° C.] | of lead | aging material | Eval- uation | N/15 mm | Curla- bility |
|---|---|---|---|---|---|---|---|---|---|---|---|---|---|---|---|---|
| Comp Ex 1 | 25/50/ 25 | — | B1 99% | E1 1% | — | C1 95% | E2 5% | B1 100% | — | 1.0 | 0.0 | A | A | D | 38 | A |
| Comp Ex 2 | 25/50/ 25 | — | B1 99% | E1 1% | A1 15% | C1 80% | E2 5% | B1 100% | — | 1.0 | 0.0 | A | A | D | 40 | A |
| Comp Ex 3 | 25/50/ 25 | A1 15% | B5 84% | E1 1% | — | C1 95% | E2 5% | B1 100% | — | 1.0 | 024 | A | D | D | 21 | C |
| Comp Ex 4 | 0/50/ 50 | — | — | — | A1 15% | C1 80% | E2 5% | B1 100% | — | — | — | A | D | D | 25 | D |

Ex = Example,
Comp Ex = Comparative Example

REFERENCE SIGNS LIST

10 . . . Energy storage device; 11 . . . Energy storage device body; 13 . . . Packaging material; 14 . . . Metal terminal; 14-1 . . . Metal terminal body; 14-2 . . . Anticorrosion layer; 16 . . . Terminal resin film; 21 . . . Inner layer; 22 . . . Inner layer-side adhesive layer; 23-1, 23-2 . . . Anti-corrosion treatment layer; 24 . . . Barrier layer; 25 . . . Outer layer-side adhesive layer; 26 . . . Outer layer; 31 . . . Innermost layer; 32 . . . Outermost layer; 33 . . . Intermediate layer.

What is claimed is:

1. A resin film for a terminal, covering a part of an outer peripheral surface of a metal terminal, the metal terminal being electrically connected to an energy storage device body of an energy storage device, the resin film comprising:
at least three layers that define a first outer surface and a second outer surface of the resin film, the first outer surface being opposed to the second outer surface;
a first adhesive layer that is one of the three layers and arranged to form the first outer surface of the resin film;
a second adhesive layer that is one of the three layers and arranged to form the second outer surface of the resin film; and
an insulating layer that is arranged between the first adhesive layer and the second adhesive layer, wherein the first adhesive layer contains first polypropylene and second polypropylene, the first polypropylene having a long-chain branched structure, the second polypropylene having no long-chain branched structure and having a melting point of 80° C. to 155° C., wherein the insulating layer does not contain long-chain branched polypropylene, and wherein an absolute difference between a melting point of the first adhesive layer and a melting point of the second adhesive layer is 0° C. to 15° C.

2. The resin film for a terminal of claim 1, wherein the first polypropylene having a long-chain branched structure has a content of 1 mass % to 50 mass % relative to a total amount of the first adhesive layer.

3. The resin film for a terminal of claim 1, wherein the first polypropylene having a long-chain branched structure is synthesized using a metallocene catalyst.

4. The resin film for a terminal of claim 1, wherein a ratio of a thickness of the second adhesive layer to a thickness of the first adhesive layer is 0.2 to 4.5.

5. The resin film for a terminal of claim 1, wherein the first adhesive layer and/or the insulating layer contains a filler.

6. The resin film for a terminal of claim 1, wherein the second adhesive layer contains a resin having a polar group.

7. An energy storage device, comprising:
an energy storage device body;
a metal terminal which is electrically connected to the energy storage device body;
a packaging material which grips the metal terminal therein and has the energy storage device body disposed therein; and
the resin film for a terminal of claim 1 that covers a part of an outer peripheral surface of the metal terminal, the resin film being disposed between the metal terminal and the packaging material, wherein
the first adhesive layer is in contact with the packaging material, the second adhesive layer contacting the metal terminal.

8. The resin film for a terminal of claim 1, wherein the insulating layer consists of block polypropylene and a filler.

* * * * *